United States Patent [19]

Muramatsu

[11] Patent Number: 5,016,725
[45] Date of Patent: May 21, 1991

[54] MOTORCYCLE HAVING ENCLOSED RUNNING COMPONENTS

[75] Inventor: Takayoshi Muramatsu, Iwata, Japan

[73] Assignee: Yamaha Hatsudoki Kabushihiki Kaisha, Iwata, Japan

[21] Appl. No.: 493,894

[22] Filed: Mar. 15, 1990

[30] Foreign Application Priority Data

Mar. 18, 1989 [JP] Japan .................. 1-67124
Mar. 18, 1989 [JP] Japan .................. 1-80291

[51] Int. Cl.⁵ .............. B62D 61/02; B62K 11/08; B60K 13/02
[52] U.S. Cl. .................. 180/225; 180/227; 180/68.3
[58] Field of Search ......... 180/219, 225, 229, 227, 180/68.3; 280/281.1

[56] References Cited

U.S. PATENT DOCUMENTS

| Re. 31,994 | 10/1985 | Tominaga et al. | 180/225 |
|---|---|---|---|
| 3,915,249 | 10/1975 | Garside | 180/229 |
| 4,347,909 | 9/1982 | Takemura et al. | 180/225 X |
| 4,411,333 | 10/1983 | Bothwell | 180/219 |
| 4,496,019 | 1/1985 | Tanaka | 180/225 X |
| 4,597,466 | 7/1986 | Yamada | 180/225 |
| 4,618,019 | 10/1986 | Ando et al. | 180/219 |
| 4,678,054 | 7/1987 | Honda et al. | 180/225 |
| 4,694,924 | 9/1987 | Asakura et al. | 180/229 X |
| 4,781,264 | 11/1988 | Matsuzaki et al. | 180/219 |
| 4,799,569 | 1/1989 | Hattori et al. | 180/225 X |

FOREIGN PATENT DOCUMENTS

0237275 9/1989 Japan .................. 180/225

Primary Examiner—Charles A. Marmor
Assistant Examiner—Kevin Hurley
Attorney, Agent, or Firm—Ernest A. Beutler

[57] ABSTRACT

A motorcycle construction that lends itself to motocross use and yet which has a lightweight racing type frame with an engine arrangement to provide a low center of gravity. Although the engine is positioned low in the frame, its components and specifically the intake and exhaust system are designed so as to be well protected and a protective covering surrounds the engine so as to also protect it. This protective covering is formed by a liquid tank such as a fuel tank for the engine and also serves to reinforce the frame assembly.

19 Claims, 9 Drawing Sheets

MOTORCYCLE HAVING ENCLOSED RUNNING COMPONENTS

BACKGROUND OF THE INVENTION

This invention relates to a motorcycle construction and more particularly to an improved motorcycle layout and a layout for a motorcycle wherein at least some of the running components are enclosed and protected.

As is well known, a motorcycle generally is comprised of a frame assembly that dirigibly supports a front wheel and which journals a driven rear wheel. The rear wheel is driven by an engine that is mounted in the frame assembly in a suitable manner between the front and rear wheels. In connection with the improvement of the performance and handling of a motorcycle, it is, of course, desirable to provide a low center of gravity for the machine. One way that this can be done is by inclining the engine from the vertical. However, with many types of applications, it is desirable to insure that the engine be well protected.

For example, a frequent use for motorcycles is with a form of competition known as motocrossing. In such competition, the motorcycle encounters extremely rough terrain. Accordingly, it is the normal practice to have a fairly high frame position relative to the ground. However, with such a motorcycle when the engine is inclined from the vertical and toward the horizontal, many of the critical components of the engine may be positioned so that they could be damaged which would adversely effect the performance and have other obvious disadvantages.

It is, therefore, a principal object of this invention to provide an improved motorcycle arrangement wherein a low center of gravity can be achieved and yet the critical components of the engine are protected.

It is a further object of this invention to provide an improved layout for a motocross type motorcycle.

It is yet another object of this invention to provide a motorcycle construction of the type wherein the engine is inclined from the vertical toward the horizontal and wherein the intake and exhaust system extend rearwardly from the engine and are protected by it.

One type of frame assembly that is utilized widely in racing machines is the type of frame that has a head pipe that journals the front wheel and a pair of angularly extending main frame members that are fabricated from boxlike sections. These members extend generally downwardly and rearwardly to a casting or other fabrication which journals the rear wheel for its suspension movement. With such an arrangement, it should be obvious that a forward inclination of the engine will place the engine in an extremely exposed area. It is, therefore, a still further object of this invention to provide an improved arrangement for protecting an engine that is inclined from the vertical and which is used in a frame assembly of the type as aforedescribed.

It is a further object of this invention to provide an improved, simplified and yet effective way of protecting an engine in a motorcycle having a fabricated box section type of frame assembly.

When the motorcycle engine is protected by some form of covering, however, this gives rise to still additional problems. For example, if the induction system is disposed rearwardly, then it can be difficult to provide adequate air flow to the engine induction system, particularly if the engine is enclosed.

It is, therefore, a still further object of this invention to provide an improved induction system for a motorcycle of the type as aforedescribed.

SUMMARY OF THE INVENTION

This invention is adapted to be embodied in a motorcycle construction that is comprised of a frame assembly that dirigibly supports a front wheel at its front and which journals a rear wheel at its rear. An engine is supported in the frame assembly and means drive the rear wheel from the engine. The engine has a cylinder block that is inclined forwardly from the vertical with a cylinder head that is affixed to the cylinder block and which extends forwardly therefrom. An induction system is provided for the engine and extends rearwardly from the cylinder block toward the rear of the frame. An exhaust pipe also extends from the cylinder block rearwardly toward the rear of the frame.

DETAILED DESCRIPTION OF THE DRAWINGS

DETAILED DESCRIPTION OF THE PREFERRED EMBODIMENT OF THE INVENTION

Figure 1:
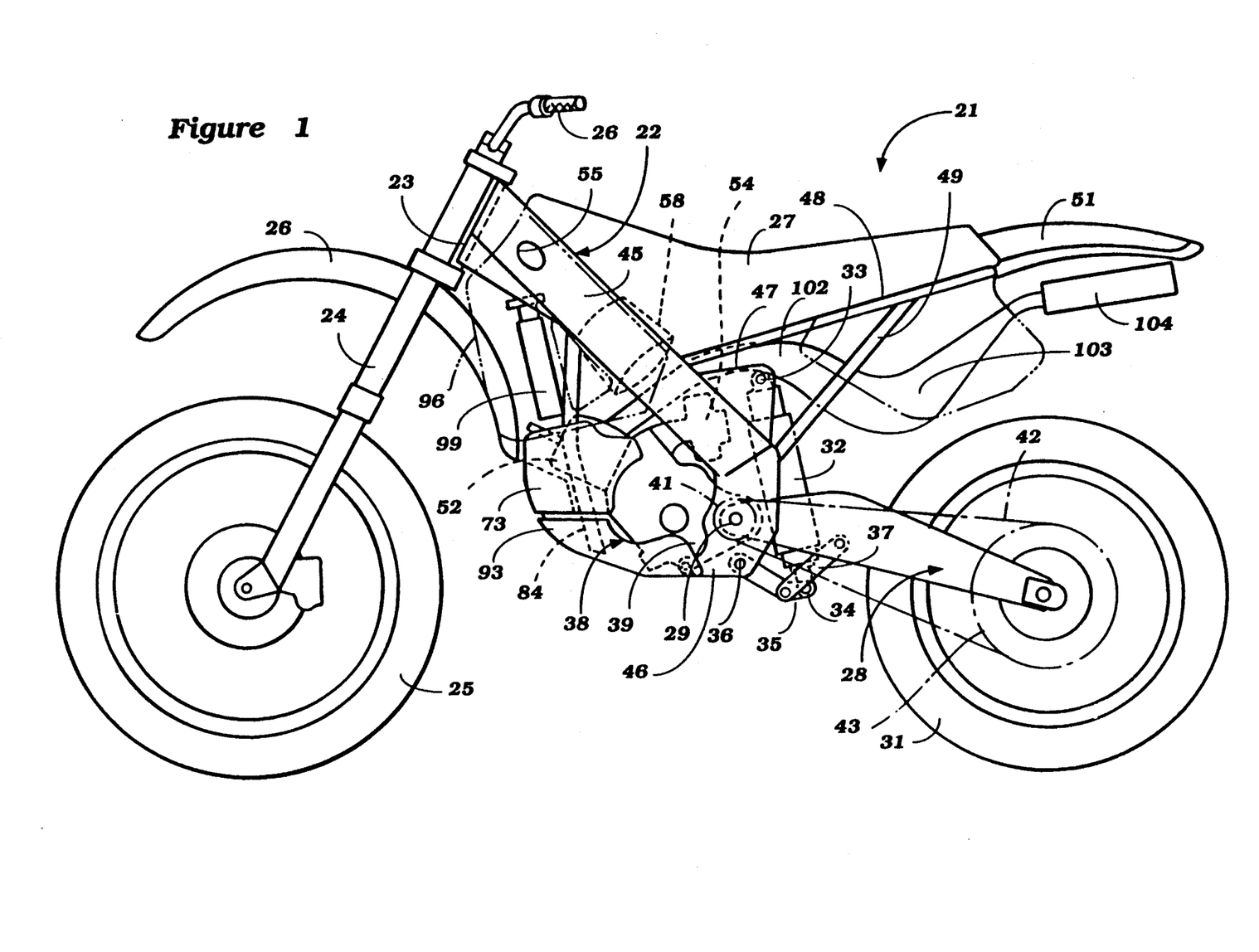
FIG. 1 is a side elevational view of a motorcycle constructed in accordance with an embodiment of the invention.
Figure 2:
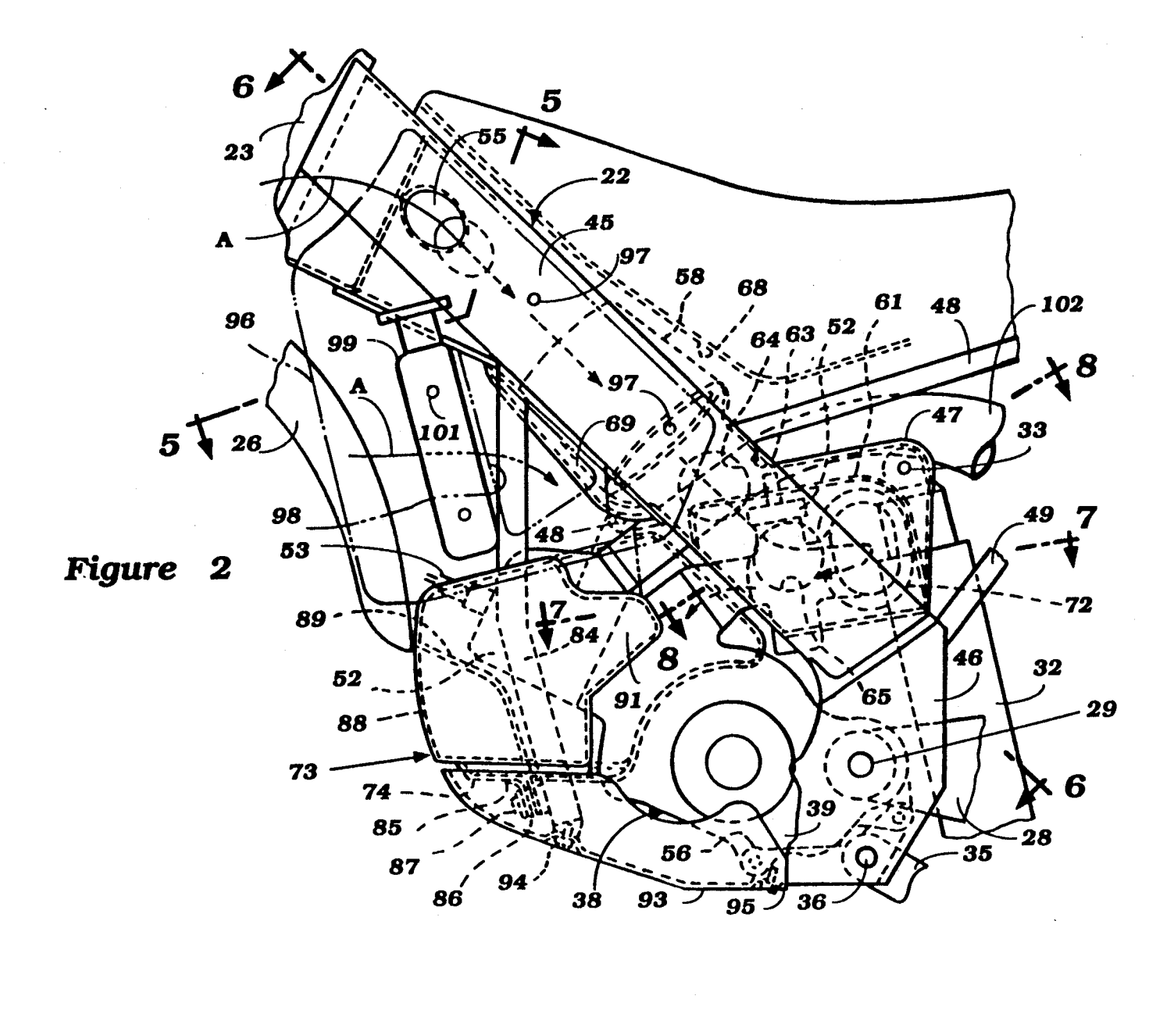
FIG. 2 is an enlarged side elevational view of a portion of the motorcycle showing the engine and its mounting in the frame.

Referring now in detail to the drawings and initially primarily to FIG. 1, a motorcycle constructed in accordance with an embodiment of the invention is identified generally by the reference numeral 21. The motorcycle 21 is designed primarily for motocross type use. Although the invention is described in conjunction with a motorcycle for such utilization, it is to be understood that certain facets of the invention can be employed in conjunction with motorcycles used for other purposes. However, for the reasons aforedescribed, the invention has particular utility in conjunction with motocross type motorcycles.

The motorcycle 21 includes a frame assembly, indicated generally by the reference numeral 22 which is of the welded up fabricated type. The frame assembly 22 includes a head pipe 23 that journals a front fork assembly 24 for steering movement. A front wheel 25 is journaled at the lower end of the front fork 24 by means which may include a suspension system of a known type. A handlebar assembly 26 is provided forwardly of a seat 27 that is mounted on the frame assembly 22 for steering of the front wheel 25 in a known manner. A front fender assembly 26 is affixed to the front fork 24 above the wheel 25.

A trailing arm assembly, indicated generally by the reference numeral 28 is pivotally supported by the frame assembly about a pivot axis defined by a pivot pin 29. A rear wheel 31 is journaled for rotation by the trailing arm assembly 28 and is driven, in a manner to be described, for powering the motorcycle 21.

A combined shock absorber spring assembly 32 has a pivotal connection at is upper end to the frame assembly 22 by means of a pivot bolt 33. The other element of the shock absorber spring assembly 32 is connected by means of a pivot pin 34 to an arm or link 35 that is pivoted on the frame assembly 22 by a pivot pin 36. A further link 37 is pivotally connected between the link 35 and the trailing arm 28 for loading the shock absorber spring assembly 32 upon pivotal movement of the trailing arm 28.

An internal combustion engine, indicated generally by the reference numeral 38 is supported within the frame assembly 22 by means of an engine mount assembly. In the illustrated embodiment, the engine 38 is of the single cylinder two cycle crankcase compression type. Although the invention can be employed with engines having other numbers of cylinders than one, the invention has particular utility in conjunction with engines wherein the cylinder block is inclined from the vertical toward the front and extends only slightly upwardly from a horizontally extending plane. The reasons for this are as have been aforenoted. Also, although the invention is described in conjunction with a two cycle crankcase compression type engine, certain facets of the invention may be employed with engines operating on the four stroke principal. However, the invention has particular utility with two stroke engines because these permit the exhaust and intake system to be positioned as will be described.

As is conventional in motorcycle practice, the engine 38 is provided with a combined crankcase change speed transmission assembly 39 that contains a plurality of gear sets that are driven from the engine crankshaft and which drive an output shaft. A sprocket 41 is affixed for rotation with this output shaft, which is also coincident with the axis defined by the pivot pin 29 and drives a chain 42 which in turn drives a sprocket 43 affixed to the rear wheel assembly 31 in a known manner.

The construction of the frame assembly 22 will now be described in further reference to FIGS. 2 through 4 and 6. Of course, certain components of the frame are shown in other of the figures, but the general overall frame construction can be best understood by reference primarily to the noted figures. As already has been noted, the frame assembly 22 is comprised of a head pipe 23. The head pipe 23 is a generally tubular member and has affixed to its opposite sides a pair of main frame members 45. The frame members 45, as may be seen in certain of the figures, have a generally boxlike rectangular configuration and may be formed from a lightweight material such as aluminum or an aluminum alloy. The main frame members 45 may be formed either as extrusions or fabrications and extend downwardly and rearwardly at approximately a 45° angle to the horizontal as may be best seen in FIG. 1.

At their rear ends, there are attached to the main frame members 45 fabrications or castings 46, which may also be formed from aluminum alloy material to provide low weight and which serve to provide the pivotal support for the trailing arms 28 and also support for the engine 38. It should be noted that in the described construction the frame assembly 22 has no down tube of the type conventionally employed with motorcycle assemblies.

A pair of brackets 47 are affixed to each of the main frame assemblies 45 and support the pin 33 for the shock absorber suspension element 32. In addition, a pair of seat rails 48 extend rearwardly from the main frame members 45 and are supported at their rear ends by back stays 49 so as to provide the support for the seat 27. A fender 51 is carried by the frame assembly and specifically the seat rails 48 in a known manner and overlies the rear wheel 31.

Figures 6, 7:
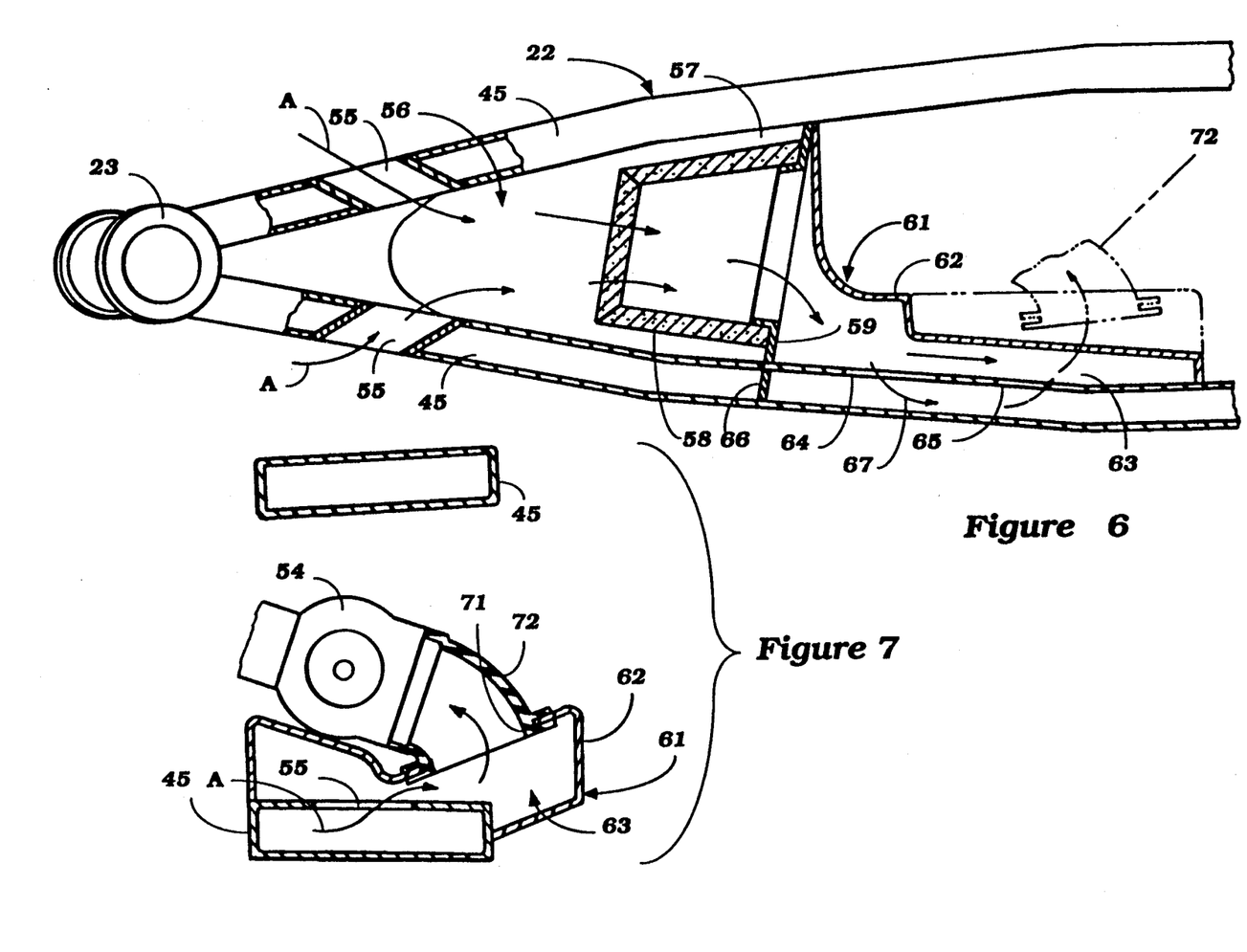
FIG. 6 is an enlarged cross sectional view taken along the line 6—6 of FIG. 2.
FIG. 7 is an enlarged cross sectional view taken along the line 7—7 of FIG. 2.
Figure 8:
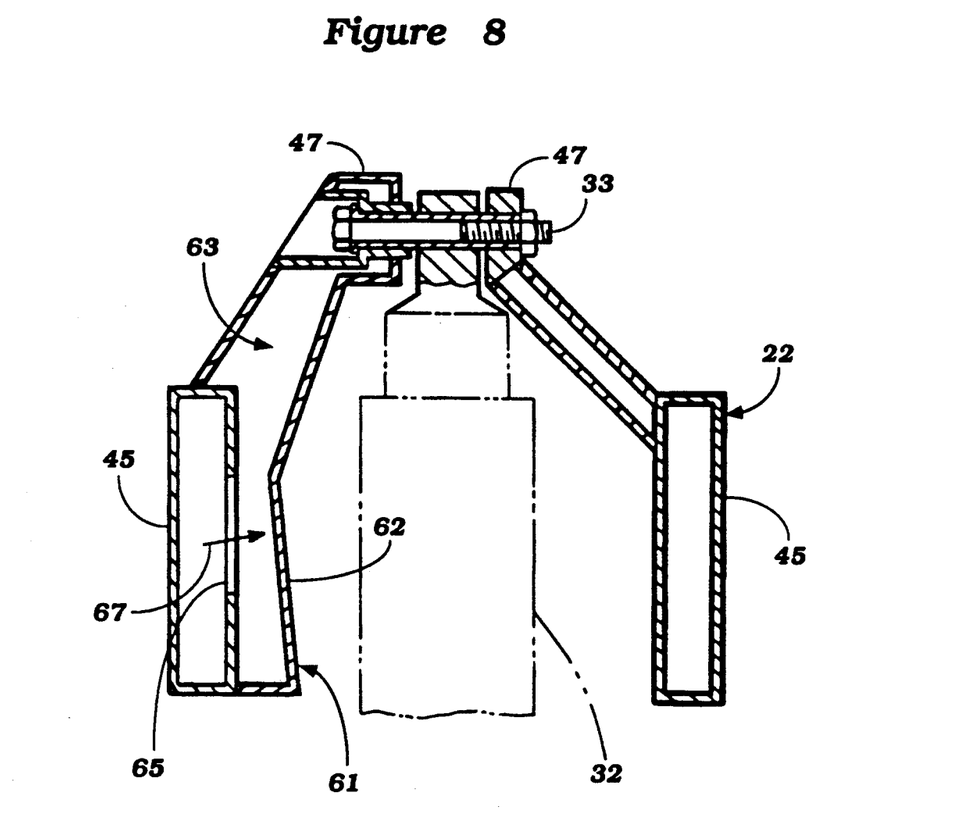
FIG. 8 is an enlarged cross sectional view taken along the line 8—8 of FIG. 2.

As may be seen from the top plan view of FIG. 6, the main frame members 45 extend at a divergent angle from the head tube 23 and then curve back toward each other where they are joined to the castings or fabrications 46. This provides a compact, high strength and yet lightweight frame assembly.

Referring now primarily to FIGS. 1 through 4, the construction of the engine 38 and its orientation in the frame assembly 22 will be described. The engine 38 includes a cylinder block 52 which, in the illustrated embodiment, is comprised of a single cylinder bore (not shown) that, as has been previously noted, is disposed at an angle to the vertical and is inclined only slightly upwardly from a horizontally extending plane. It will be noted that the cylinder block 52 thus extends generally within the area defined by the main frame members 45 but because of its orientation, it extends forwardly therefrom.

A cylinder head is affixed to this cylinder block and supports a spark plug 53 for firing the charge in the engine as is well known in this art. The charge is admitted to the crankcase chamber of the engine 38 from a charge former comprised of a carburetor 54 that is disposed to the rear of the cylinder block 52 and between the main frame members 45. The carburetor 54 may be of any known type and receives fuel from a fuel system, to be described, and mixes it with air to provide a combustible mixture to the crankcase chamber of the engine 38.

The air supply system for the carburetor 54 includes a pair of air inlet openings 55 (see FIG. 6 in addition to those figures already mentioned) formed in the main frame members 45 immediately to the rear of the head pipe 23. The air inlet openings 55 are generally forwardly facing and hence intake air will flow in the direction of the arrows A as shown in FIG. 6 through these intake openings 55 to an area 56 formed between the main frame members 45. This air area is also further confined by means of radiator covers to be described.

An air filter chamber 57 is formed between the main frame members 45 to the rear of the cavity 56 and an air cleaner element 58 having a generally cup or dome shape is provided in this area 57. A baffle plate 59 carries the air cleaner element 58 and has an opening that communicates the interior of the air filter element 58 with an air box 61. The air box 61 is formed in part by means of a baffle plate 62 that is affixed to one side of one of the main frame members 45 and which defines a plenum chamber 63. The plenum chamber 63, as aforenoted, communicates with the outlet of the air filter element 58 and also communicates with the open interior of this main frame member through an inlet opening 64 and an outlet opening 65. This recess is sealed from the forward part of the frame assembly by means of a baffle plate 66. Hence, air may flow in the direction of the arrow 67 through the rear of the main frame tube 45 so as to provide additional volume for the plenum chamber 63.

It should be noted that the underside of the seat 27 is provided with a recessed area 68 that defines the top of the air cleaner chamber 57 and the frame members 45 are spanned by a lower baffle plate 69 so as to generally enclose the area of the air flow path so as to confine the air flow through the filter element 58 before it can enter the plenum chamber 63.

The plenum chamber 63 is provided with an outlet opening 71 that communicates with a flexible duct 72 which, in turn, supplies the air to the inlet for the carburetor 54. As a result, adequate and copious supplies of ram air will be supplied to the carburetor 54 even though its inlet is rearwardly facing and even though the carburetor 54 is concealed within and confined between the frame assembly 42 and other components either already described or to be described. All of this air must flow through the filter element 58 which can be conveniently reached for servicing through removal of the side plates which will be described.

Figure 11:
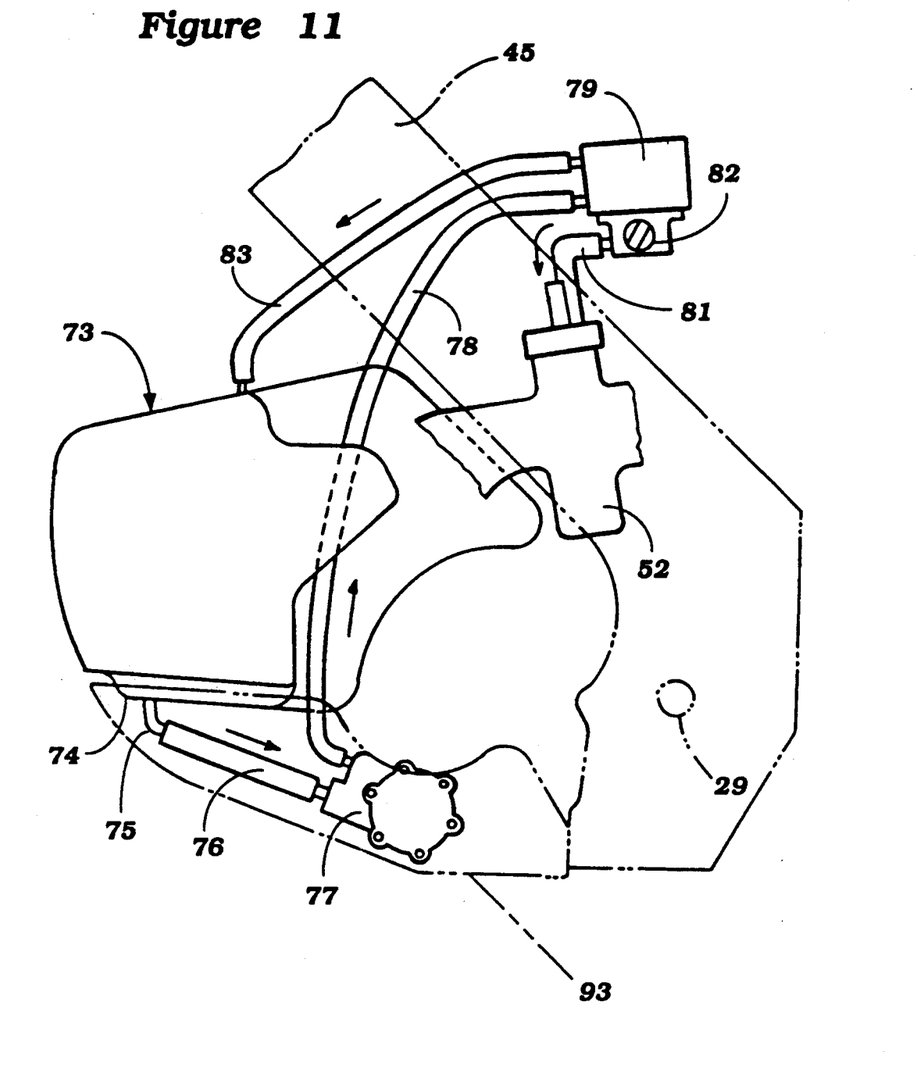
FIG. 11 is a side elevational view showing the fuel supply system for the engine with certain components of the motorcycle being shown in phantom.

The fuel feed and supply system for the engine 38 will now be described by particular reference to FIG. 11. As may be seen, there is provided a generally saddle shaped fuel tank 73 having a location to be described. The fuel tank 73 is provided with a recesses lower wall 74 that has an outlet fitting 75 that communicates with a conduit 76 for delivering fuel to an engine driven fuel pump 77. This fuel is then delivered through a conduit 78 to a small reserve tank 79 that is positioned vertically above the carburetor 52 so as to deliver fuel by gravity through a conduit 81 to the carburetor 52. A fuel shut off valve 82 is provided at the base of the reserve tank 79 so as to permit the shut off of fuel to the carburetor 52. Excess fuel is supplied under many running conditions to the reserve tank 79. This excess fuel is returned, by gravity, back to the main fuel tank 73 through an overflow line 83.

Figure 9:
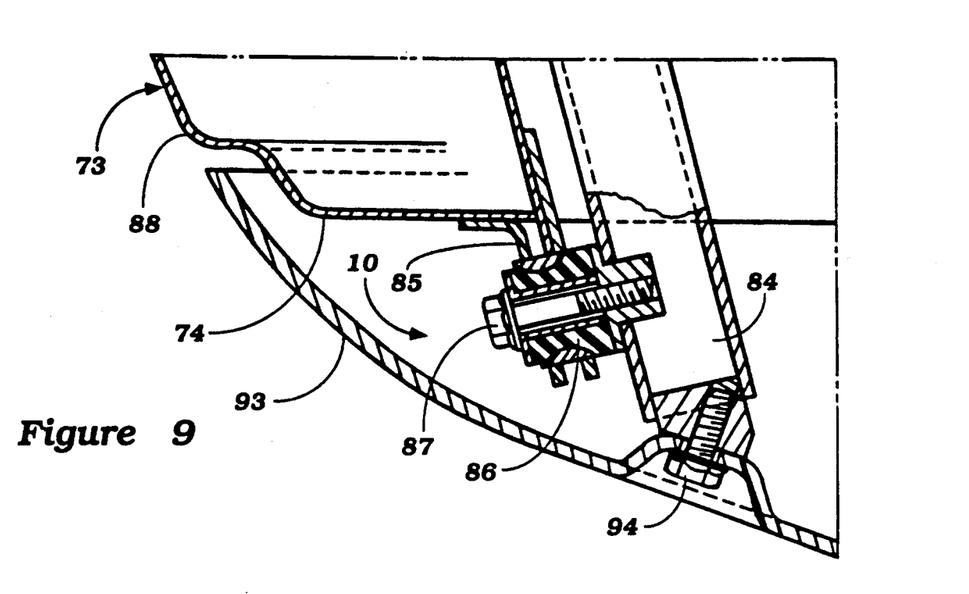
FIG. 9 is an enlarged cross sectional view showing the engine guard and certain components associated therewith.
Figure 10:
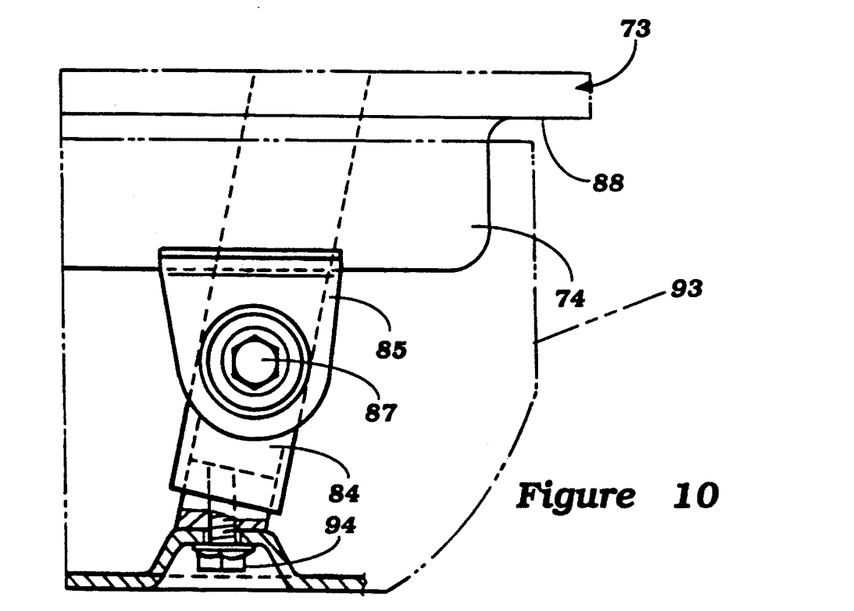
FIG. 10 is a view taken generally in the direction of the arrow 10 in FIG. 9.

As has been noted, the engine 38 and specifically the cylinder block 52 extends forwardly of the frame assembly and specifically of the main frame members 45. In order to provide protection for the engine and specifically its cylinder block 52 and so as to support the fuel tank 73 in a location that will not only maintain a low center of gravity but which will also afford further protection for the engine, there are provided a pair of depending tubular members 84 of a box like configuration that are fixed at their upper ends to the main frame members 45. The lower wall 74 of the fuel tank 73 is provided with a pair of angularly formed support brackets 85 (FIGS. 9 and 10) that have openings that receive elastic support bushings 86 which, in turn, receive bolts 87 that are threaded into threaded openings in the members 84 so as to provide forward support for the fuel tank 73 at a low area in the frame.

It should be noted that the fuel tank 73 has a generally U or saddle shaped configuration both in top plan view and in front elevational view. The fuel tank 74 has a generally upstanding front wall 88 which, as may be seen in FIG. 4, extends upwardly across a portion of the cylinder block 52. However, in the area of the cylinder head, the wall 84 is joined by an arcuate wall 89 that defines a recess so as to permit air to flow in across the engine for its cooling. The recess 89 forms right and left side wing sections 91 and 92 which extend rearwardly along opposite sides of the cylinder barrel 52 so as to provide its protection. These sections extend generally outwardly of the support tubes 84.

In addition to the support for the engine provided for by the fuel tank 73, there is further provided a lower engine guard, indicated generally by the reference numeral 93 which has a generally cup shape and which is secured to the lower ends of the support tubes 84 by means of threaded fasteners 94. The rear end of the engine guard 93 is also connected to the fabrications or castings 46 by means of threaded fasteners 95. As a result, the engine guard 93 further serves the purpose of forming a structural member for the frame assembly and cradles the engine 38 therein.

Figure 5:
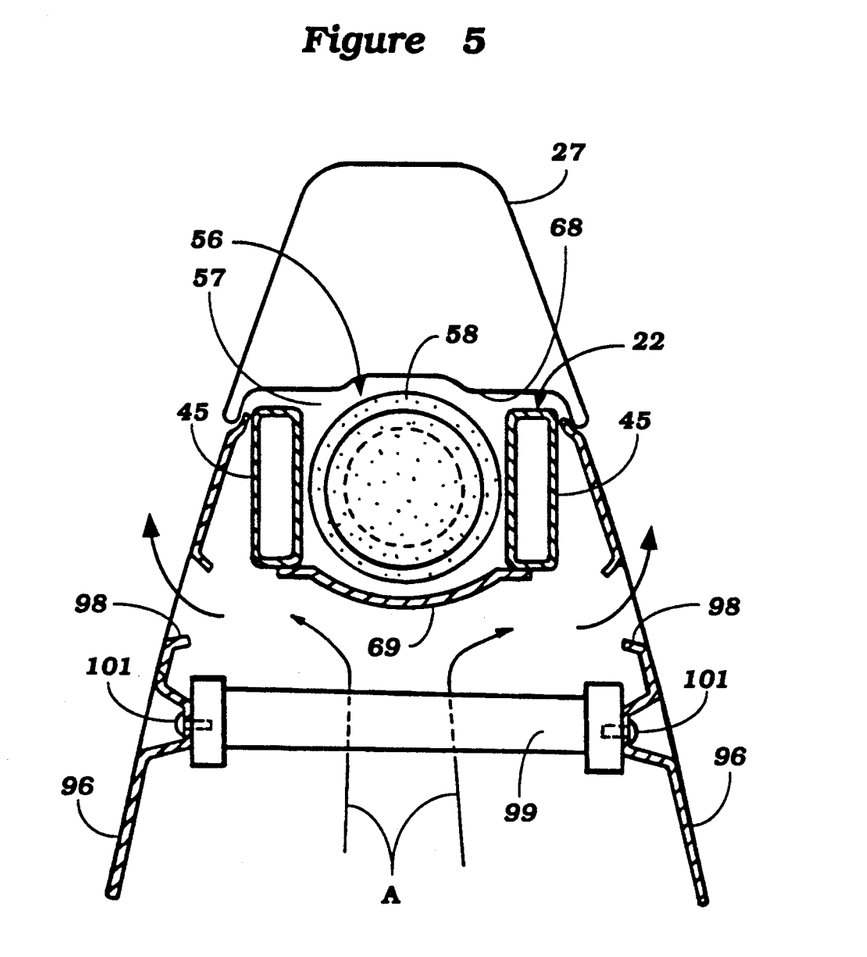
FIG. 5 is a cross sectional view taken along the line 5—5 of FIG. 2 and is on an enlarged scale.

To further enclose the forward portion of the motorcycle around the frame 22, there are provided a pair of spaced apart radiator plates 96, each of which is affixed to an opposite side of a respective one of the main frame members 45 by means of threaded fasteners that pass through suitable apertures 97 formed in the main frame member. These radiator covers 96 are shown in phantom in some of the drawings so as to more clearly show the remaining components. As may be seen in FIG. 5, the radiator covers 96 have recessed areas 98 formed at their upper ends so as to permit air to exit therefrom which has passed across the engine and radiator, as will be described, for its cooling.

A radiator 99 extends transversely between the radiator guards 96 and is affixed thereto by fasteners 101 so that the radiator 99 will be positioned in an area of good air flow. The engine, of course, is, therefore, at least partially water cooled and water is circulated through the radiator 99 by means of a cooling pump of a known type. Since the cooling system of the engine 38 per se forms no part of the invention, it is believed unnecessary to further describe it. However, the positioning and support for the radiator 99 is one of the significant features of the invention in that the radiator 99 is disposed so that it will be protected and yet adequately cooled.

Figure 3:
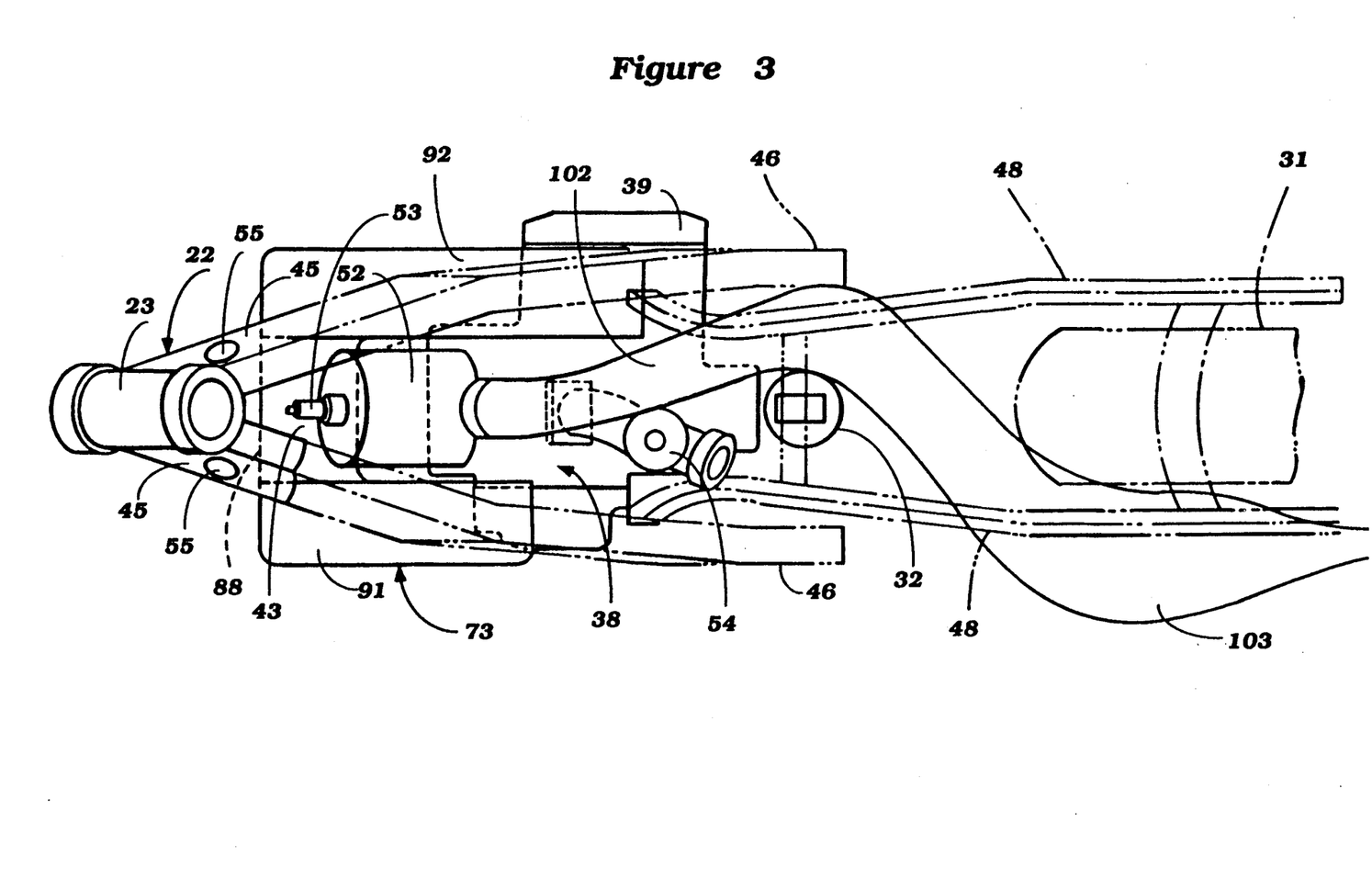
FIG. 3 is an enlarged top plan view of the motorcycle with portions removed and other portions shown in phantom so as to more clearly show the construction.
Figure 4:
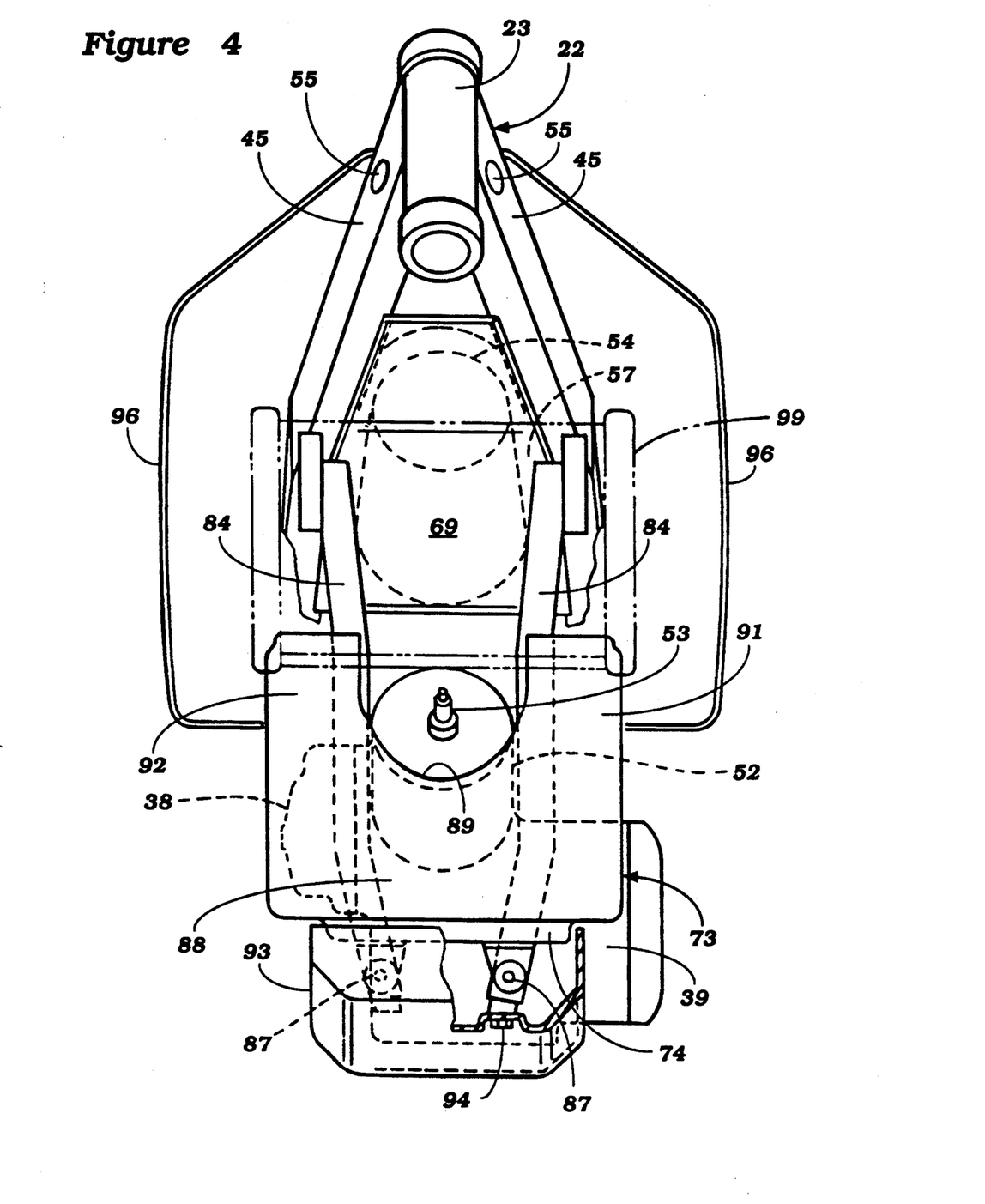
FIG. 4 is a front elevational view of the frame assembly and shows the engine and its placement within the frame assembly.

In addition to the components already described, the motorcycle and specifically its engine 28 is also provided with an exhaust system. In accordance with the other basic principles of the invention, the exhaust system is designed in such a way that it will not be exposed where it might be damaged due to the sporting nature of the use of the motorcycle 21. This exhaust system is best shown in FIGS. 1 and 3 and includes an exhaust pipe 102 that extends rearwardly from the cylinder block 52 in the area above and adjacent the carburetor 54. The exhaust pipe 102 passes over and to one side of the suspension element 32 and there extends into an expansion chamber 103 that lies beneath the fender 51 and above the rear wheel 31. The expansion chamber 103, in turn, discharges into a muffler 104 having a tail pipe (not shown) for discharge of the exhaust gases to the atmosphere.

It should be readily apparent from the described construction that the motorcycle configuration chosen provides an extremely low center of gravity, particularly considering the motocross application for the motorcycle, and nevertheless locates the critical components such as the exhaust system and induction system to the rear of the engine so that they will be protected. In addition, various other components of the motorcycle are disposed so as to protect the engine while still permitting a compact assembly. Although the foregoing description is that of a preferred embodiment of the invention, it should be readily apparent to those skilled in the art that various changes and modifications may be made without departing from the spirit and scope of the invention, as defined by the appended claims.

I claim:

1. A motorcycle construction comprising a frame assembly, a front wheel dirigibly supported at the front of said frame assembly, a rear wheel journaled at the rear of said frame assembly, an engine supported by said frame assembly, and means for driving said rear wheel from said engine, said engine having a cylinder block inclined forwardly from the vertical with a cylinder head affixed to its cylinder block and extending forwardly therefrom, an induction system for said engine extending from the rear of said frame forwardly to the rear side of said cylinder block to deliver a charge thereto, and an exhaust pipe extending rearwardly from said cylinder block toward the rear of said frame said induction system and said exhaust pipe being positioned in their entirety behind said cylinder block.

2. A motorcycle construction as set forth in claim 1 wherein the induction system and the exhaust pipe lie above the cylinder block.

3. A motorcycle construction as set forth in claim 2 wherein the cylinder block is inclined slightly upwardly from a horizontally extending plane.

4. A motorcycle construction as set forth in claim 3 further including a cover assembly affixed to frame assembly and at least partially enclosing the cylinder head and cylinder block.

5. A motorcycle construction as set forth in claim 4 wherein the cover comprises a liquid tank for containing a liquid for the engine.

6. A motorcycle construction as set forth in claim 5 wherein the liquid tank comprises a fuel tank.

7. A motorcycle construction as set forth in claim 1 wherein the frame assembly comprises a head pipe journaling the front wheel for its dirigible movement and a pair of box shaped main frame members extending rearwardly and downwardly from said head pipe and diverging outwardly from each other so as to lie generally on opposite sides of the engine.

8. A motorcycle construction as set forth in claim 7 further including a seat affixed to the frame assembly immediately adjacent the rear of the head pipe.

9. A motorcycle construction as set forth in claim 7 wherein the induction system and the exhaust pipe lie above the cylinder block.

10. A motorcycle construction as set forth in claim 8 wherein the cylinder block is inclined slightly upwardly from a horizontally extending plane.

11. A motorcycle construction as set forth in claim 9 further including a cover assembly affixed to frame assembly and at least partially enclosing the cylinder head and cylinder block.

12. A motorcycle construction as set forth in claim 10 wherein the cover comprises a liquid tank for containing a liquid for the engine.

13. A motorcycle construction as set forth in claim 11 wherein the liquid tank comprises a fuel tank.

14. A motorcycle construction as set forth in claim 7 further including air inlet openings formed in the main frame members for delivering air therethrough to the engine induction system.

15. A motorcycle construction as set forth in claim 14 further including an air filter element positioned rearwardly of the air inlet openings in the frame and filtering air passing rearwardly to an air inlet for the engine induction system.

16. A motorcycle construction as set forth in claim 3 wherein the engine is a two cycle crankcase compression type engine.

17. A motorcycle construction as set forth in claim 16 further including a cover assembly affixed to frame assembly and at least partially enclosing the cylinder head and cylinder block.

18. A motorcycle construction as set forth in claim 17 wherein the cover comprises a liquid tank for containing a liquid for the engine.

19. A motorcycle construction as set forth in claim 18 wherein the liquid tank comprises a fuel tank.

* * * * *